Jan. 4, 1927.　　　　　W. PRINGLE　　　　　1,612,833
PIPE CLAMP AND CONNECTION
Filed Feb. 10, 1922　　2 Sheets-Sheet 1

Inventor
Wayne Pringle,
by Wallace R. Lane.
Atty.

Jan. 4, 1927.

W. PRINGLE

PIPE CLAMP AND CONNECTION

Filed Feb. 10, 1922  2 Sheets-Sheet 2

1,612,833

Inventor
Wayne Pringle,
by Wallace R. Lane.
Atty

Patented Jan. 4, 1927.

1,612,833

UNITED STATES PATENT OFFICE.

WAYNE PRINGLE, OF LINCOLN, NEBRASKA, ASSIGNOR TO WOODS BROTHERS CONSTRUCTION COMPANY, OF LINCOLN, NEBRASKA, A CORPORATION OF NEBRASKA.

PIPE CLAMP AND CONNECTION.

Application filed February 10, 1922. Serial No. 535,626.

While the uses of my device are more or less wide spread, the same is designed more especially for use in connection with self sinking piles, which are oftentimes sunk to such a depth that it is practically impossible to get at the hose connection so as to release the same. While this is particularly true in cases where the pile is sunk in the bed of a stream where the top may be several feet below the surface, it may also occur in soft sandy structures where it is desired to sink an anchor some distance below the surface of the sand. Among the objects of my invention, therefore, are to provide a readily disconnectible pipe connection suitable for work of the character stated, such that one section of the pipe can be disconnected from the other by means of a longitudinal pull; to provide an improved clamp by means of which a pipe may be suspended and handled and which can be detached from the pipe from a distance in a simple manner; to provide an improved clamp, the parts of which can be readily separated by means of a pull longitudinally of the pipe to which the clamp is connected: and such further objects, advantages and capabilites as will later more fully appear.

My invention further resides in the combination, construction and arrangement of parts illustrated in the accompanying drawings, and while I have shown therein a preferred embodiment, I desire the same to be understood as illustrative only and not as limiting my invention.

In the drawings annexed hereto and forming a part hereof,

Figure 1:
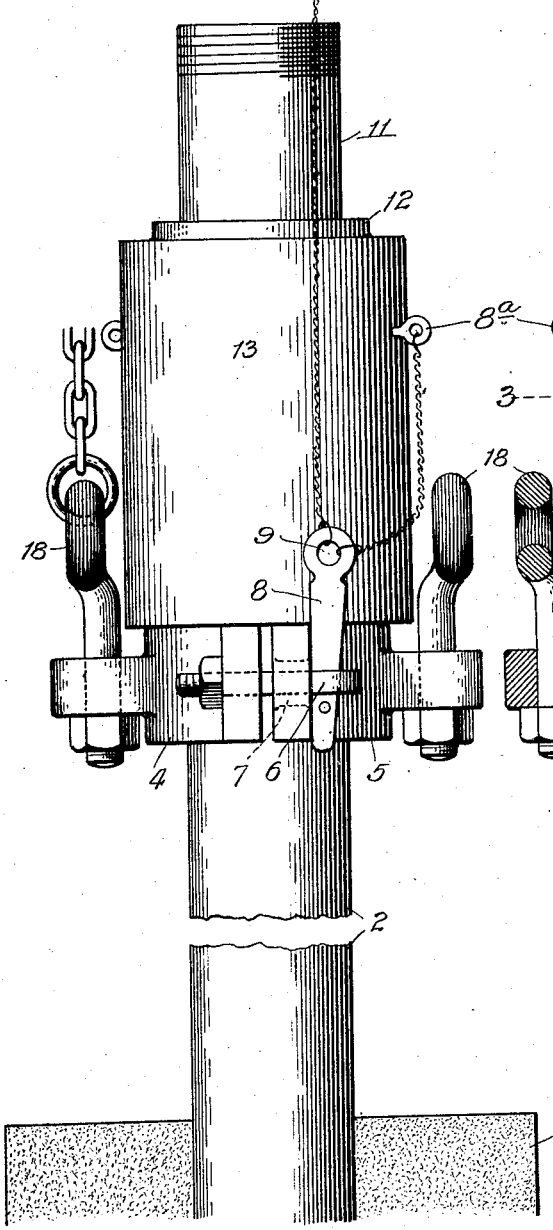
Fig. 1 shows a broken elevation of the upper portion of a self sinking pile, together with the upper end of the fluid supply pipe thereof and the pipe connected thereto for leading water into the pile from an external source of supply.
Figure 2:
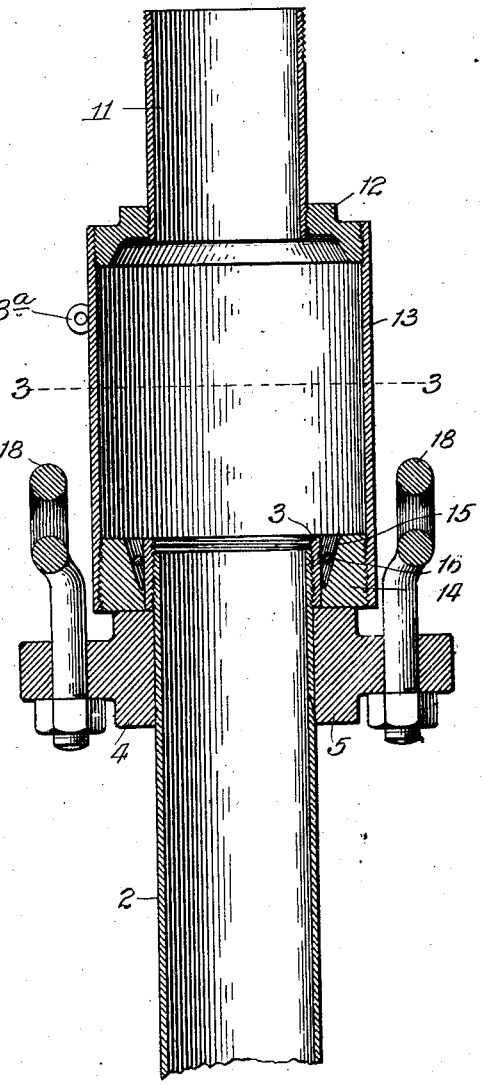
Fig. 2 is a fragmentary longitudinal section of such a construction.
Figure 3:
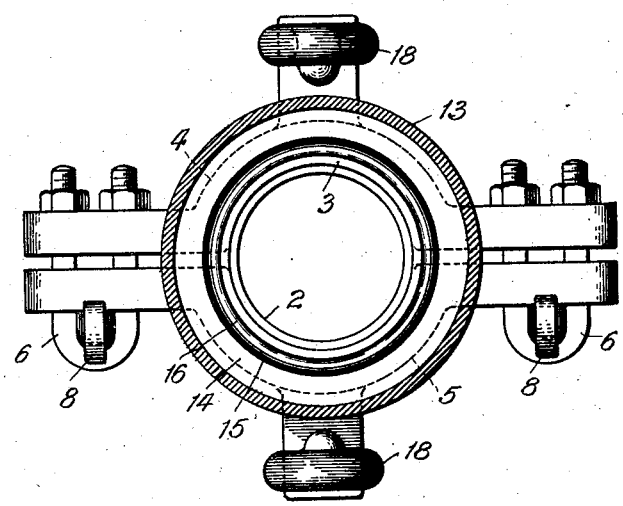
Fig. 3 is a horizontal sectional plan substantially along the plane indicated by the line 3—3 Fig. 2.
Figure 4:
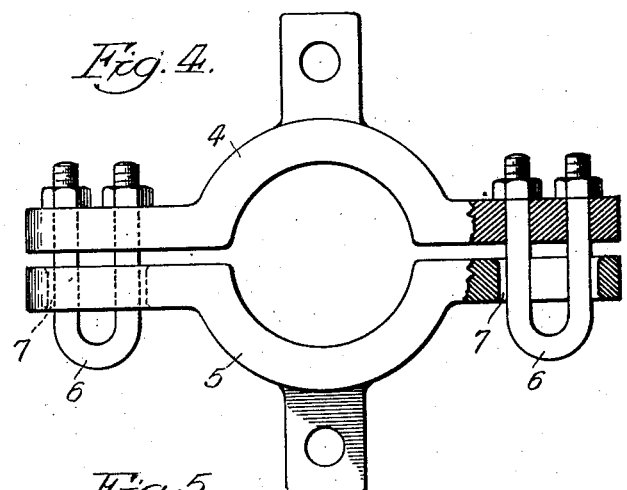
Fig. 4 is a broken plan view of the clamp shown in the other figures, with the locking keys omitted.
Figure 5:
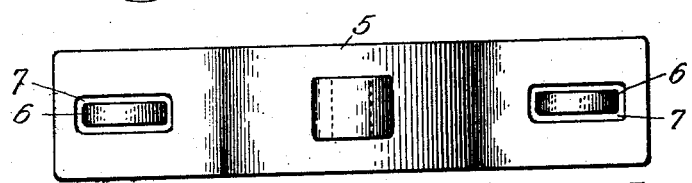
Fig. 5 is an elevation of the construction shown in Fig. 4.

Referring more in detail to the annexed drawings, numeral 1 designates the outer or concrete portion of a self sinking pile, while numeral 2 designates the fluid feed pipe extending longitudinally through the interior of this pile. Secured to the upper end of the pipe 2 is a coupling 3, forming a flange-like projection around the upper portion of the pipe, below which may engage the parts 4 and 5 of the clamp. Looped members 6, in the form of U-bolts or eye-bolts are secured in opposite ends of one of the members, as 4, or one is secured in one end of each of these members 4 and 5, the looped portion extending through a suitable slot in the co-operating end of the other member. As shown in the present drawings, these slots 7 are both in member 5, but it will be understood that one of the members 6 may be mounted in member 4 while the other one is mounted in the opposite end of member 5. These looped members 6 are adapted to be fastened in place by means of keys 8, each provided in one end with an aperture 9, to which may be secured a flexible member by means of which keys 8 may be withdrawn from a distance by a longitudinal pull on the flexible member. A short flexible member may also connect keys 8 with eyes or the like 8ª, so that they will not become misplaced or lost and will at all times be handy for use. It will therefore be seen that if the pile has been sunk to a depth below the water surface or land surface, so that the clamp is inaccessible, or, if for any other reason, this be true, it will be easy, by pulling on the flexible members, to withdraw the keys from the openings in the members 6. When this has been done members 4 and 5 will readily separate and swing away from beneath the flange-like member 3, thus permitting the mechanism by means of which the piles are handled to be withdrawn without difficulty. To cooperate in permitting this to be done the pipe 11 is connected to the pipe 2 by means of such a connection that the one can be separated from the other by a longitudinal pull thereon. As shown in the present drawings, this is accomplished by securing an internally and externally threaded ring 12 to the lower end of pipe 11 and securing to this ring a sleeve 13, the opposite end of which is provided with a ring 14, internally bevelled as shown at 15, so that a rubber or similar ring 16 may be inserted to form a tight joint between the parts as shown. This connection forms a joint between sleeve 13 and pipe 2 sufficiently tight so that there is substantially no leakage between these parts when the water is being forced through the piping to cause the pile to sink.

As shown in the drawings, means, in the form of eye-bolts 18, is secured in members 4 and 5 so that flexible means, such as chains, may be secured thereto for the handling of the piles.

It is of course understood that the specific description of structure set forth above may be departed from without departing from the spirit of my invention as set forth in this specification and the appended claims.

Having now described my invention, I claim:—

1. Means for raising and lowering a pipe, including a separable clamp, one of the parts thereof having U-bolts extending transversely of the ends thereof, the other part having slots therein through which the bend of the U may slide and beyond which it may project, locking keys adapted to slide through the projecting bend of the U-bolts, and means for pulling longitudinally on the keys to withdraw them from locking position.

2. A pipe clamp of the character described comprising a pair of complementary pipe engaging members provided at their respective ends with cooperating extensions, perforated for the reception of means to hold the members together around a pipe, means secured in one of said perforated ends and provided with a vertically opening looped portion to be slipped through the perforated end of the cooperating pipe engaging member, and means to be longitudinally slipped vertically through the looped portion to hold the parts in cooperative relation or to permit them to be separated.

3. A pipe clamp of the character described comprising a pair of complementary pipe engaging members provided at their respective ends with cooperating extensions, perforated for the reception of means to hold the members together around a pipe, means secured in one of each pair of said cooperating perforated ends and each provided with a vertically opening looped portion to be slipped through the perforated end of the cooperating pipe engaging member, means to be passed longitudinally into the looped portions to hold the parts in cooperative relation or to be pulled out to permit them to be separated, and means connected to said last named means for withdrawing them from a distant position.

4. A structure of the character described comprising a pair of complementary curved members adapted to engage and substantially surround a pipe, said members each being provided with a perforated projection, supporting means passing through said perforations whereby the supported structure may be raised or lowered, means mounted in the opposite ends of one of said curved members and each adapted to extend through a perforation in the other member, and means adapted to pass through said last named means to hold the curved members together or to be withdrawn therefrom by being pulled lengthwise in the direction of the length of the supported pipe.

5. A structure of the character described comprising a pair of members curved to cooperate in the supporting of a pipe or similarly shaped structure, means for sustaining, raising and lowering said members, looped members each secured in one of said first named members and slidable through a perforation in the cooperating member to release the members from each other, locking pins slidable through said looped members, and means attached to said pins for withdrawing them from a distance.

In witness whereof, I hereunto subscribe my name to this specification.

WAYNE PRINGLE.